US012573918B2

(12) United States Patent
Biro et al.

(10) Patent No.: US 12,573,918 B2
(45) Date of Patent: Mar. 10, 2026

(54) MOTOR FLYWHEEL WITH INTEGRATED MAGNETIC SENSOR RING

(71) Applicant: Nidec Motor Corporation, St. Louis, MO (US)

(72) Inventors: Joshua M. Biro, St. Charles, MO (US); William D. Moore, Florissant, MO (US)

(73) Assignee: Nidec Motor Corporation, St. Louis, MO (US)

( * ) Notice: Subject to any disclaimer, the term of this patent is extended or adjusted under 35 U.S.C. 154(b) by 217 days.

(21) Appl. No.: 18/495,473

(22) Filed: Oct. 26, 2023

(65) Prior Publication Data

US 2025/0141315 A1     May 1, 2025

(51) Int. Cl.
H02K 11/215     (2016.01)
H02K 7/02     (2006.01)
H02K 11/22     (2016.01)

(52) U.S. Cl.
CPC ............. H02K 11/215 (2016.01); H02K 7/02 (2013.01); H02K 11/22 (2016.01); H02K 2211/03 (2013.01)

(58) Field of Classification Search
CPC ........ H02K 11/215; H02K 11/22; H02K 7/02; H02K 7/025; H02K 2203/03; H02K 2211/03
USPC ........................................ 310/68 R, 68 B, 74
See application file for complete search history.

(56) References Cited

U.S. PATENT DOCUMENTS

| | | | | | |
|---|---|---|---|---|---|
| 5,070,268 | A | * | 12/1991 | Phelon | H02K 21/14 |
| | | | | | 310/156.55 |
| 6,424,061 | B1 | * | 7/2002 | Fukuda | H02K 29/08 |
| | | | | | 310/68 B |
| 6,680,553 | B1 | * | 1/2004 | Takano | H02K 29/08 |
| | | | | | 310/68 B |
| 2012/0133249 | A1 | * | 5/2012 | Konkola | G03B 37/02 |
| | | | | | 310/68 B |
| 2016/0238105 | A1 | * | 8/2016 | Moore | H02K 5/225 |
| 2017/0237314 | A1 | * | 8/2017 | Moore | F16H 1/28 |
| | | | | | 475/149 |
| 2022/0140672 | A1 | * | 5/2022 | Shimokawa | H02K 1/2746 |
| | | | | | 417/423.7 |

FOREIGN PATENT DOCUMENTS

WO     WO-2019143032 A1 * 7/2019     ............... H02K 1/12

OTHER PUBLICATIONS

Machine translation of WO-2019143032-A1. (Year: 2019).*

* cited by examiner

*Primary Examiner* — Michael Andrews
(74) *Attorney, Agent, or Firm* — Hovey Williams LLP

(57)     ABSTRACT

A motor broadly includes a rotor, a flywheel, and an encoder assembly. The rotor is rotatable about an axis and includes a rotor shaft. The flywheel is fixed to the rotor shaft and is rotatable with the rotor shaft. The encoder assembly includes a magnetic sensor assembly and a sensed magnetic element supported by the flywheel.

10 Claims, 9 Drawing Sheets

MOTOR FLYWHEEL WITH INTEGRATED MAGNETIC SENSOR RING

BACKGROUND

1. Field

The present invention relates generally to an electric motor assembly. The motor assembly is preferably for use in an autonomous guided vehicle or, more particularly, in a robot for use in a warehousing system. However, any one or more of a variety of motor assembly uses are suitable.

2. Discussion of Prior Art

Those skilled in the art will understand that electric motor assemblies are often used in a variety of applications, including but not limited to vehicles, autonomous devices, home appliances such as dishwashers and washing machines, exercise equipment, pumps, and more.

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

A first aspect of the present invention concerns a motor that broadly includes a rotor, a flywheel, and an encoder assembly. The rotor is rotatable about an axis and includes a rotor shaft. The flywheel is fixed to the rotor shaft to rotate therewith. The encoder assembly includes a sensed optical element and a sensed magnetic element. The encoder assembly further includes an optical sensor assembly configured to sense relative movement of the optical element and a magnetic sensor assembly configured to sense relative movement of the magnetic element. The sensed elements are mounted on the flywheel for rotational movement therewith, such that the optical sensor assembly and the magnetic sensor assembly are each configured to sense rotation of the flywheel.

A second aspect of the present invention concerns a motor that broadly includes a rotor, an encoder assembly, and a flywheel. The rotor is rotatable about an axis and includes a rotor shaft. The encoder assembly includes a rotatable magnetic ring and a relatively stationary magnetic sensor assembly. The magnetic sensor assembly includes a magnetic sensing chip positioned axially along the rotor shaft. The flywheel is fixed to the rotor shaft to rotate therewith. The flywheel includes a hub that fixedly supports the magnetic ring in at least partial axial alignment with the magnetic sensing chip such that rotation of the magnetic ring is sensed by the magnetic sensing chip.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 1:
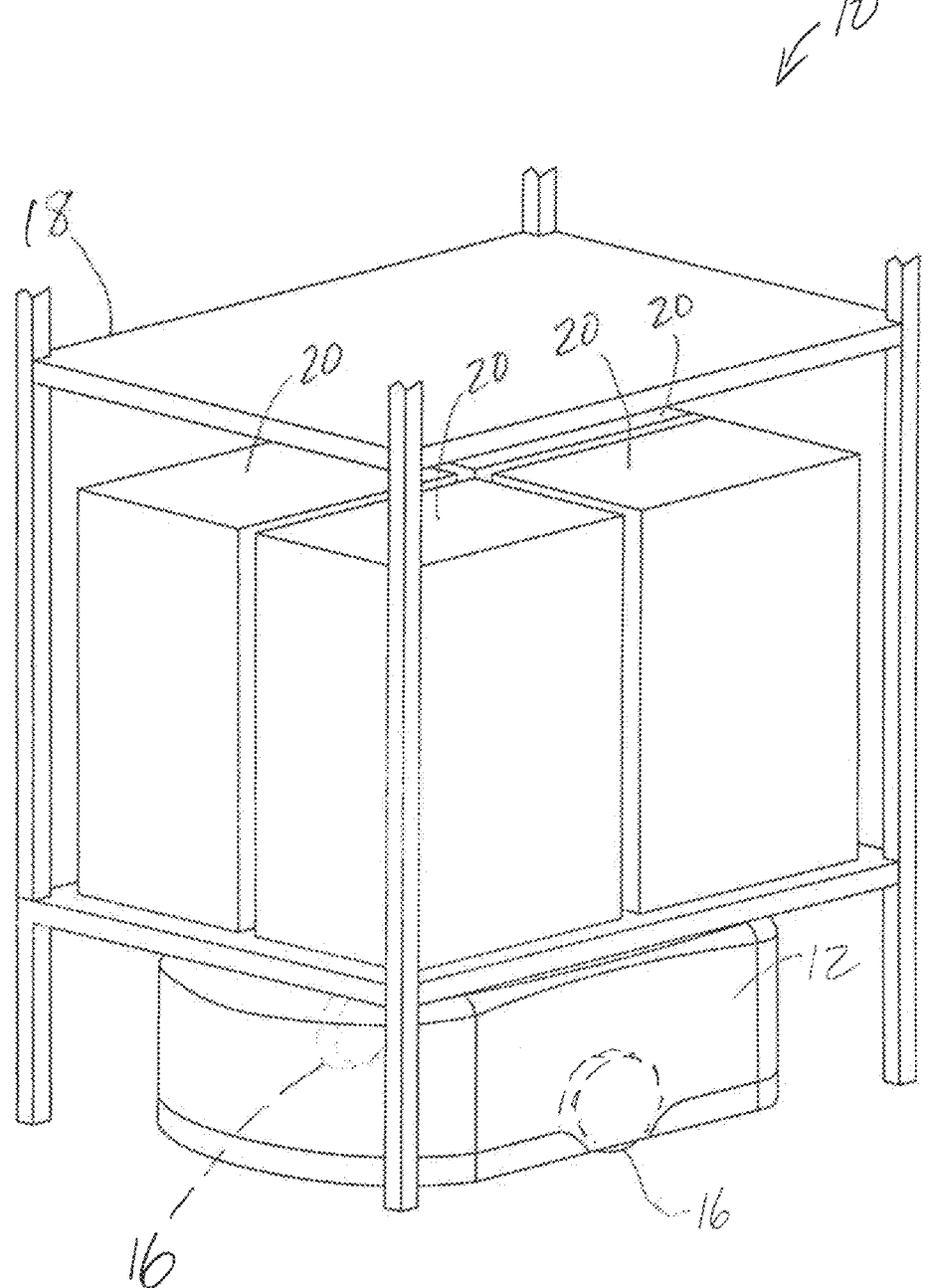
FIG. 1 illustrates a robot, shelving, and goods, wherein the robot includes a pair of motors and wheels and is operable to transport the shelving and goods.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Referring initially to FIG. 1, a robot 10 is provided in accordance with a preferred embodiment of the present invention. The robot 10 preferably includes a main body 12 supported on a chassis (not shown), a support platform (not shown), and a pair of rotatable, ground-engaging wheels 16 enabling the robot 10 to have a zero-turn radius.

The robot 10 is preferably configured to transport goods in a warehouse environment. For instance, in a preferred embodiment, the robot 10 is configured to transport shelving 18 and various goods 20 supported thereon through a warehouse environment. More particularly, the robot 10 is preferably operable at least to (1) lift the shelving 18 and associated goods 20; (2) rotate the shelving 18 and goods 20 about a vertical axis; (3) transport the shelving 18 and goods 20 from one location to another in the warehouse, making use of the wheels 16; (4) deposit the shelving 18 and goods 20 at their new location; and (5) completely disengage from the shelving 18 and goods 20 via lowering of a portion of the robot 10 so as to no longer be in contact with the shelving 18 and/or goods 20.

The robot 10 is preferably provided with numerous features to enable such operation, including but not limited to one or more printed circuit boards, sensors, cameras, and communication devices. A control system (not shown) is also preferably provided to control each robot 10 and to synchronize operation of multiple robots 10 in a warehouse. The robot 10 is preferably battery-powered and rechargeable.

In a preferred embodiment, the robot 10 includes a pair of motors 110, each of which is associated with a respective one of the wheels 16 to form a respective traction assembly 112, and which cooperatively enable the robot 10 to travel through the warehouse.

Although the motors 110 are preferably part of the robot 10 and function generally as described above, it is within the scope of the present invention for the motor assemblies to instead be provided in an alternative application and/or to be provided separately from one another. For instance, the locomotion motor assemblies might instead be provided for use in an electric vehicle for human transport. Furthermore, certain features of each of the motor assemblies may be used in entirely different applications than shown. For example, certain aspects of the motor 110 might be capable of use in motor assemblies that are not used to drive or propel a wheeled vehicle.

Figure 2:
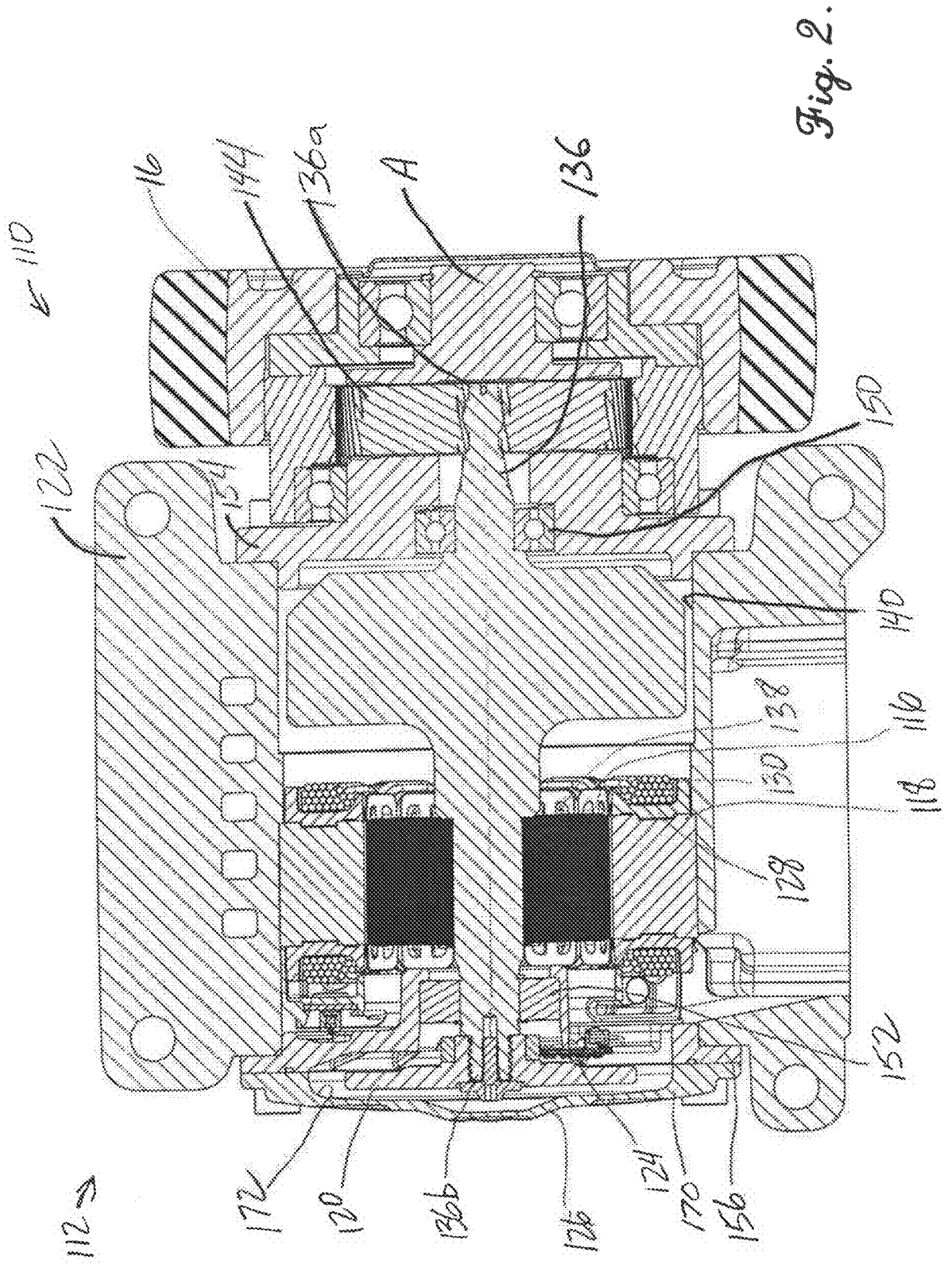
FIG. 2 is a cross-sectional view of a motor and wheel of FIG. 1.

With reference to FIG. 2, the traction assembly 112 in accordance with a preferred embodiment of the present invention is illustrated. As noted previously, the traction assembly 112 preferably includes one motor 110 and one of the wheels 16.

The motor 110 preferably includes a rotor 116 rotatable about a rotor axis A, a stator 118, and a flywheel 120 fixed to the rotor to rotate therewith. The motor 110 further preferably includes a motor housing 122, an encoder assembly 124, and an encoder housing 126.

The motor 110 preferably comprises an inner rotor motor, with the stator 118 at least substantially circumscribing the rotor 116. The stator 118 preferably includes a generally toroidal stator core 128 and wiring 130. The wiring 130 forms a plurality of coils wound about the stator core 128.

The rotor 116 is preferably rotatable about the rotor axis A and includes a rotor shaft 136. A rotor core 138 is fixed to the rotor shaft 136 to rotate therewith. Rotor 116 also includes a plurality of circumferentially spaced magnets fixed to the rotor core 138 to rotate therewith. Rotor shaft 136 presents opposite shaft ends 136a, 136b.

The motor housing 122 defines a motor chamber 140. The stator 118 and the rotor 116 are preferably least substantially received in the motor chamber 140.

A planetary gear assembly 144 preferably transfers rotation of the rotor shaft 136 to the wheel 16. More particularly, the gear assembly 144 preferably decreases rotational speed from the rotor shaft 136 to the wheel 16 while increasing torque. Although a gear assembly 144 as illustrated is preferred, a direct drive configuration is permissible according to some aspects of the present invention.

The motor 110 preferably includes a pair of rotor shaft bearings 150 and 152 for rotatably supporting the rotor shaft 136. An end plate 154 preferably defines a bearing sleeve for supporting the rotor shaft bearing 150, while an opposite end plate 156 defines a bearing sleeve for supporting the rotor shaft bearing 152. Thus, in the illustrated embodiment, the end plates 154 and 156 function as motor endshields.

Turning to FIGS. 2-8, the preferred motor 110 again includes the encoder assembly 124 and encoder housing 126. The encoder housing 126 preferably comprises a base plate 170. Base plate 170 cooperates with the end plate 156 to define a flywheel chamber 172 that at least substantially houses the flywheel 120 and the encoder assembly 124. It is also within the scope of the present invention for the encoder housing to cooperate with one or more other parts of the motor housing to define the flywheel chamber. Furthermore, embodiments of the encoder housing may be include one or more other components that cooperate with the motor housing to define the flywheel chamber.

The encoder assembly 124 is preferably configured to at least in part control operation of the motor 110 and includes a stationary circuit board 174 and electronic components, as will be described below.

The flywheel chamber 172 is preferably disposed axially outside the motor chamber 140, although other arrangements (such as an alternative relative axial position) are permissible according to some aspects of the present invention. Preferably, the motor chamber 140 and the flywheel chamber 172 are connected via a portal 176. At least some of the lead wires (not shown) may be routed through (extend through) the portal 176 to connect the encoder assembly 124 and other parts of the motor 110.

It is preferred that the flywheel chamber 172 be spaced at least substantially axially from the motor chamber 140. More particularly, the end plate 156 preferably presents axially opposed inner and outer faces 180 and 182, respectively. The inner face 180 is preferably adjacent the motor chamber 140 (and opposite the flywheel chamber 172). The outer face 182 is axially opposite the motor chamber 140 so as to be adjacent the flywheel chamber 172. The base plate 170 is thus preferably fixed to the end plate 156 adjacent the outer face 182.

The motor housing 122 and the encoder housing 126 each preferably comprise a metal such as aluminum, although other metals or types of materials may be used according to some aspects of the present invention.

The illustrated flywheel 120 has a unitary construction and includes a wheel disc 190 and a center wall 192. Preferably, the wheel disc 190 and center wall 192 cooperatively form a hub 194 and a threaded opening 196 that receives an end 136b of the rotor shaft 136. A fastener 197 serves to removably secure the flywheel 120 to the end 136b. The hub 194 preferably defines an annular recess 198 (see FIGS. 6A and 6B) configured to receive a magnetic ring. It is also consistent with at least certain aspects of the present invention for one or more components of the flywheel to be alternatively configured. For example, alternative embodiments may contemplate different hub configurations suitable for receiving a sensed magnetic element.

The depicted flywheel 120 preferably comprises a nonferrous material. More preferably, the nonferrous material comprises a zinc material. It is also within the scope of certain aspects of the present invention for the flywheel to include an alternative nonferrous material, such as a nonferrous metal (such as aluminum, titanium, copper, etc.) and/or a nonferrous synthetic resin material.

Figure 3:
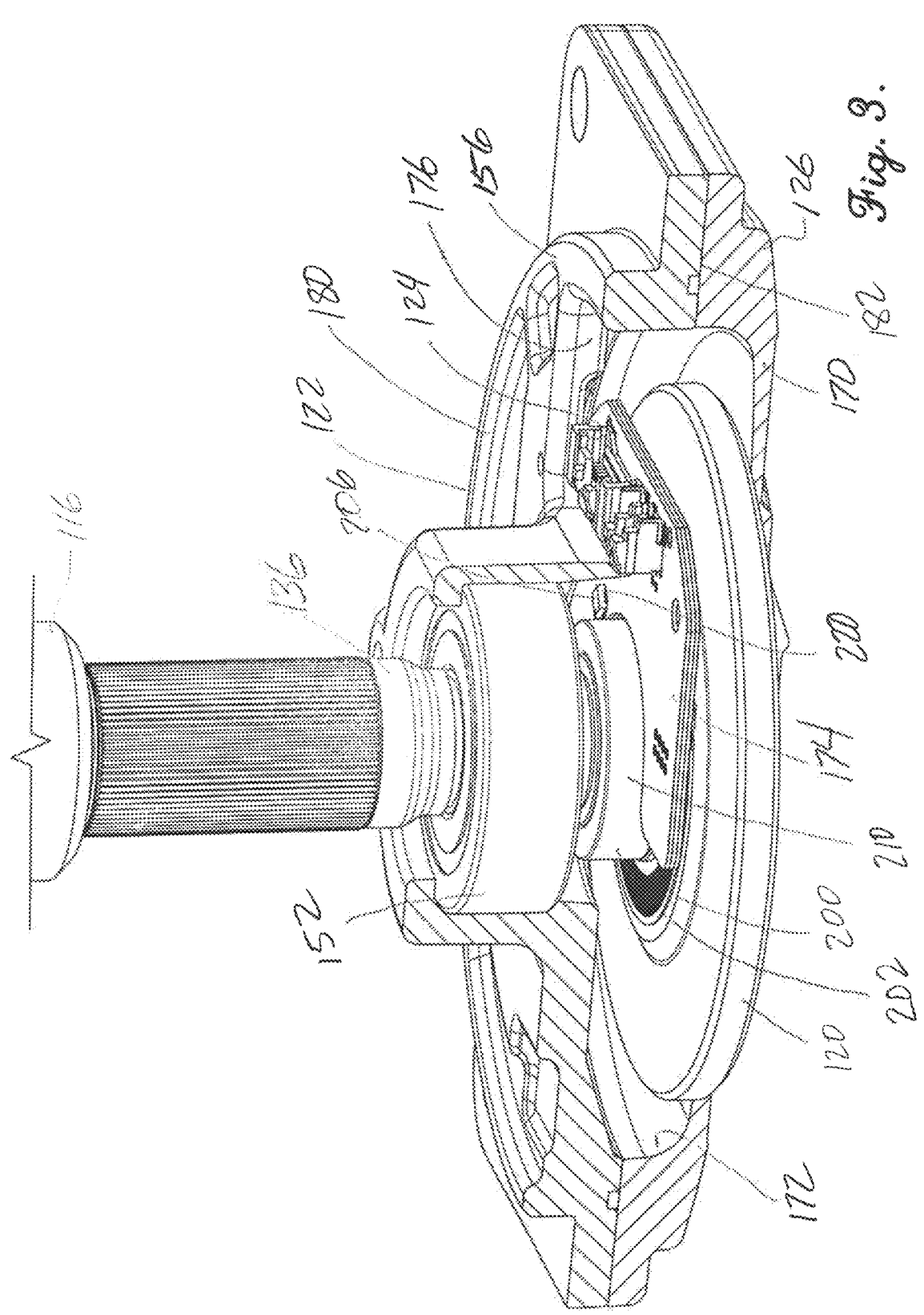
FIG. 3 is a partially sectioned perspective view of a portion of the motor of FIG. 2, particularly illustrating the flywheel attached to a rotor shaft, the encoder assembly, and a base plate attached to an end plate of the motor housing to form a flywheel chamber.
Figure 4:
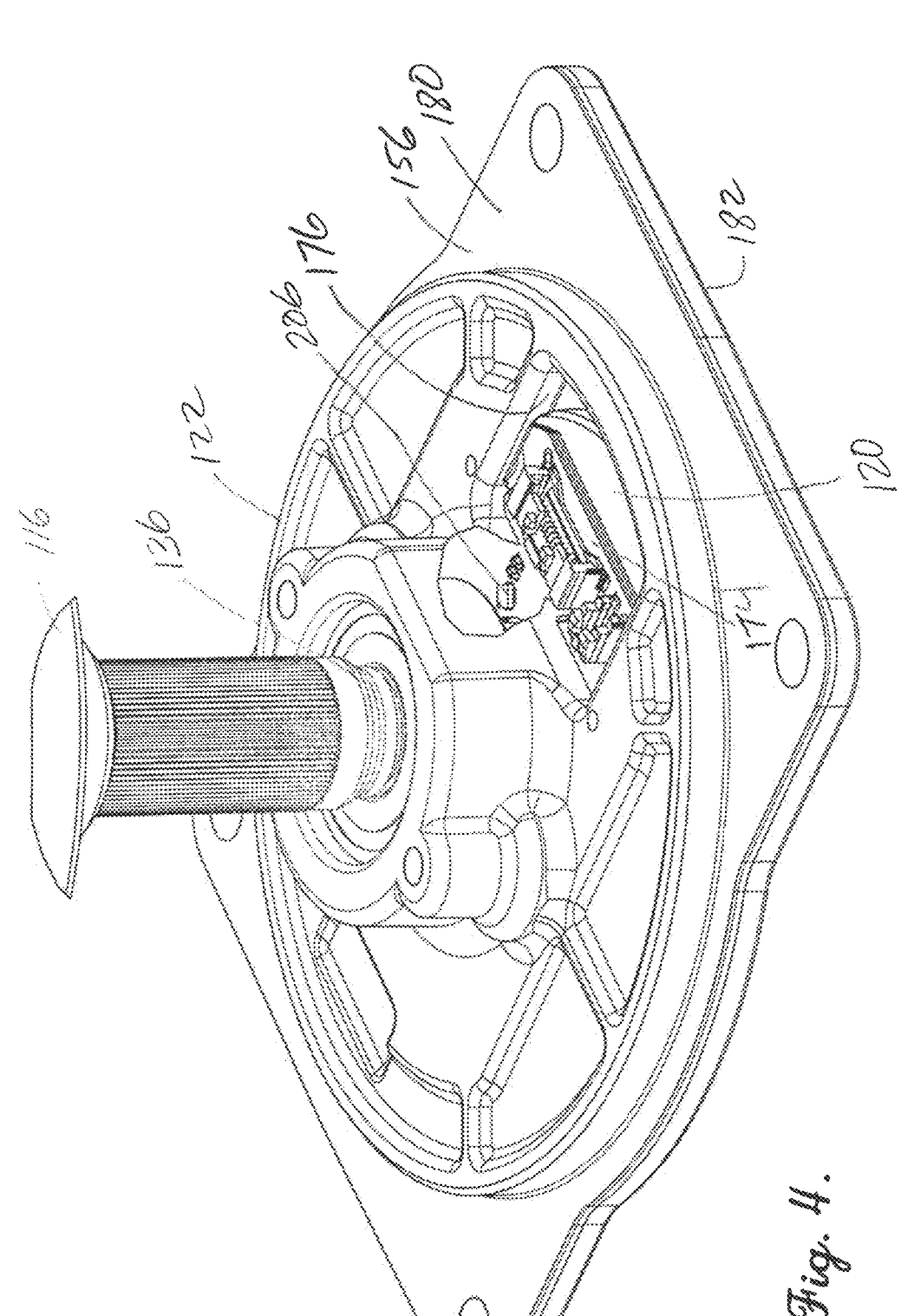
FIG. 4 is a fragmentary perspective view of the motor of FIGS. 2 and 3, depicting the rotor shaft, flywheel, encoder assembly, and end plate, with the base plate removed.
Figure 5:
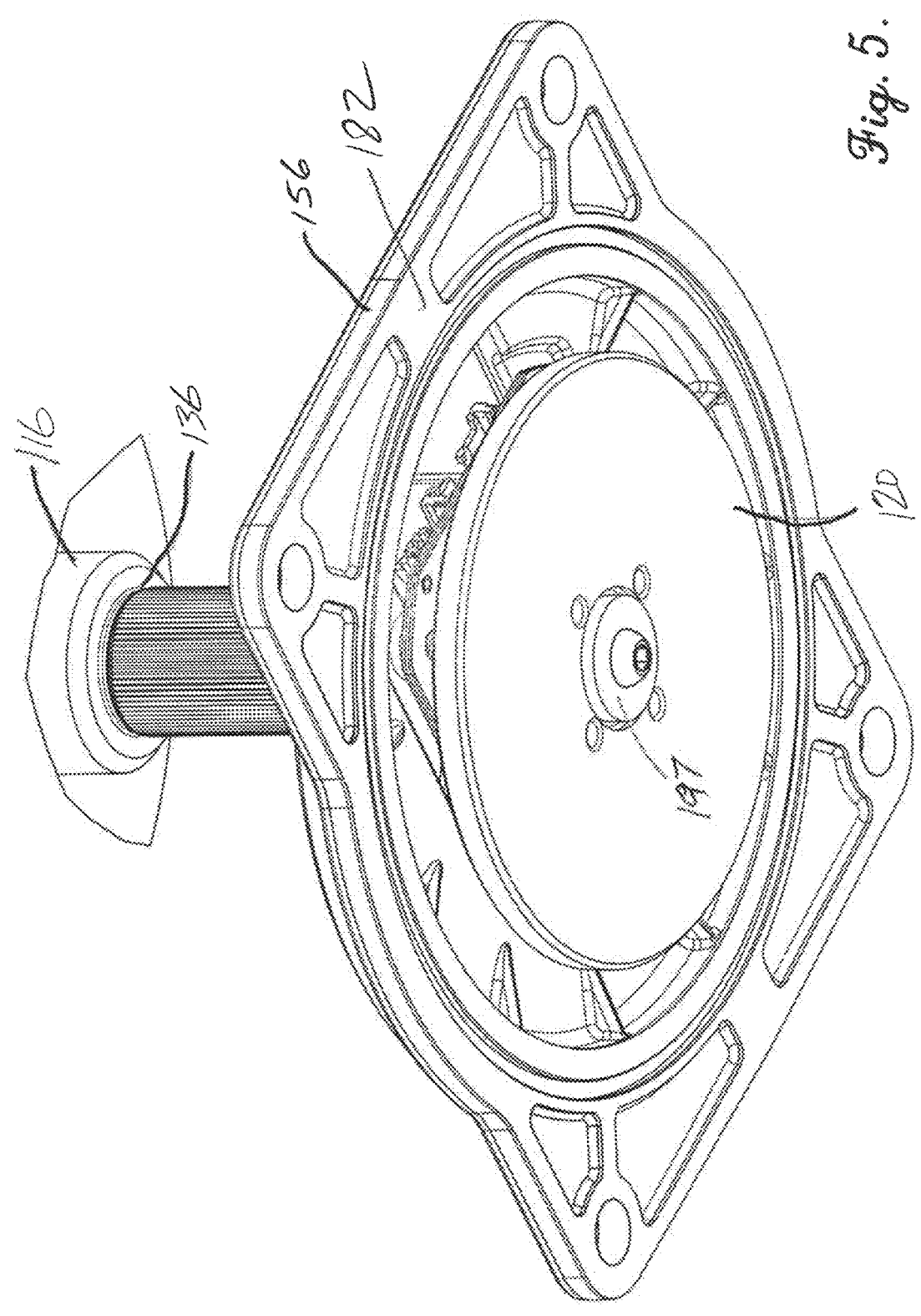
FIG. 5 is a fragmentary perspective view of the motor similar to FIG. 4, but taken from the opposite side of the end plate.
Figure 8:
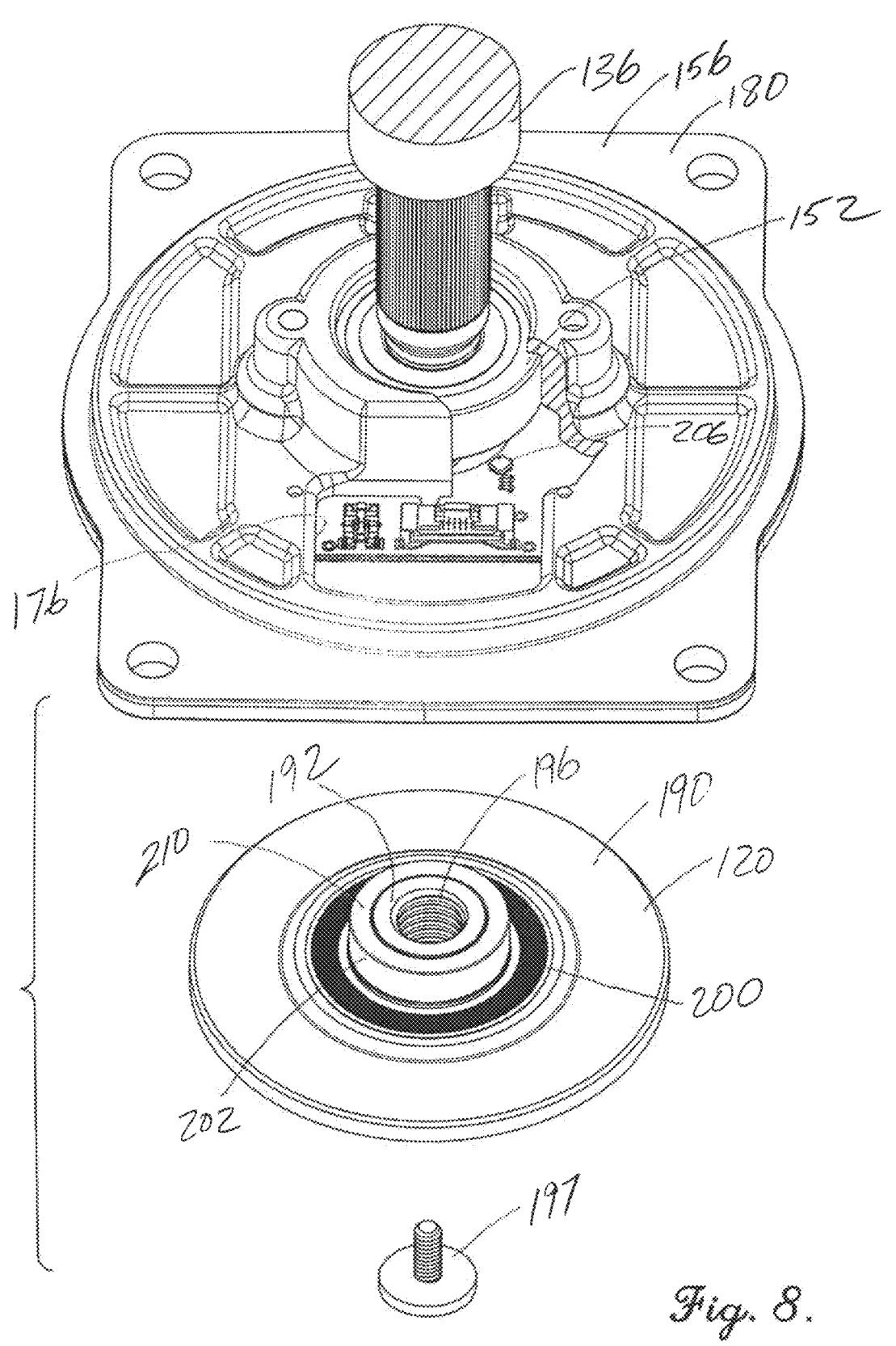
FIG. 8 is a fragmentary exploded perspective view of the motor similar to FIG. 7, but taken from the opposite side of the end plate.

The encoder assembly 124 preferably includes a sensed optical element 200 and a sensed magnetic element 202 (see FIGS. 3 and 8). The encoder assembly 124 also preferably includes an optical sensor assembly 204, a magnetic sensor assembly 206, and the stationary circuit board 174 (see FIGS. 6A and 6B). As will be discussed below, it is also within the ambit of certain embodiments of the present invention for the encoder assembly to be devoid of a sensed optical element and an optical sensor assembly.

The depicted circuit board 174 is mounted adjacent the flywheel 120 in a stationary location and supports the sensor assemblies 204 and 206 in proximity to the flywheel 120. In preferred embodiments, the circuit board 174 is positioned to extend radially along the wheel disc 190 and axially overlap the center wall 192.

The illustrated circuit board 174 is located axially between the magnetic sensor assembly 206 and the wheel disc 190, although alternative arrangements are within the scope of certain aspects of the present invention. In at least certain alternative embodiments, the magnetic sensor assembly may be located axially between the circuit board and the wheel disc.

Preferably, the sensed elements 200 and 202 are mounted on the flywheel 120 for rotational movement therewith, such that the optical sensor assembly 204 and the magnetic sensor assembly 206 are each configured to sense rotation of the flywheel 120.

Figure 6A:
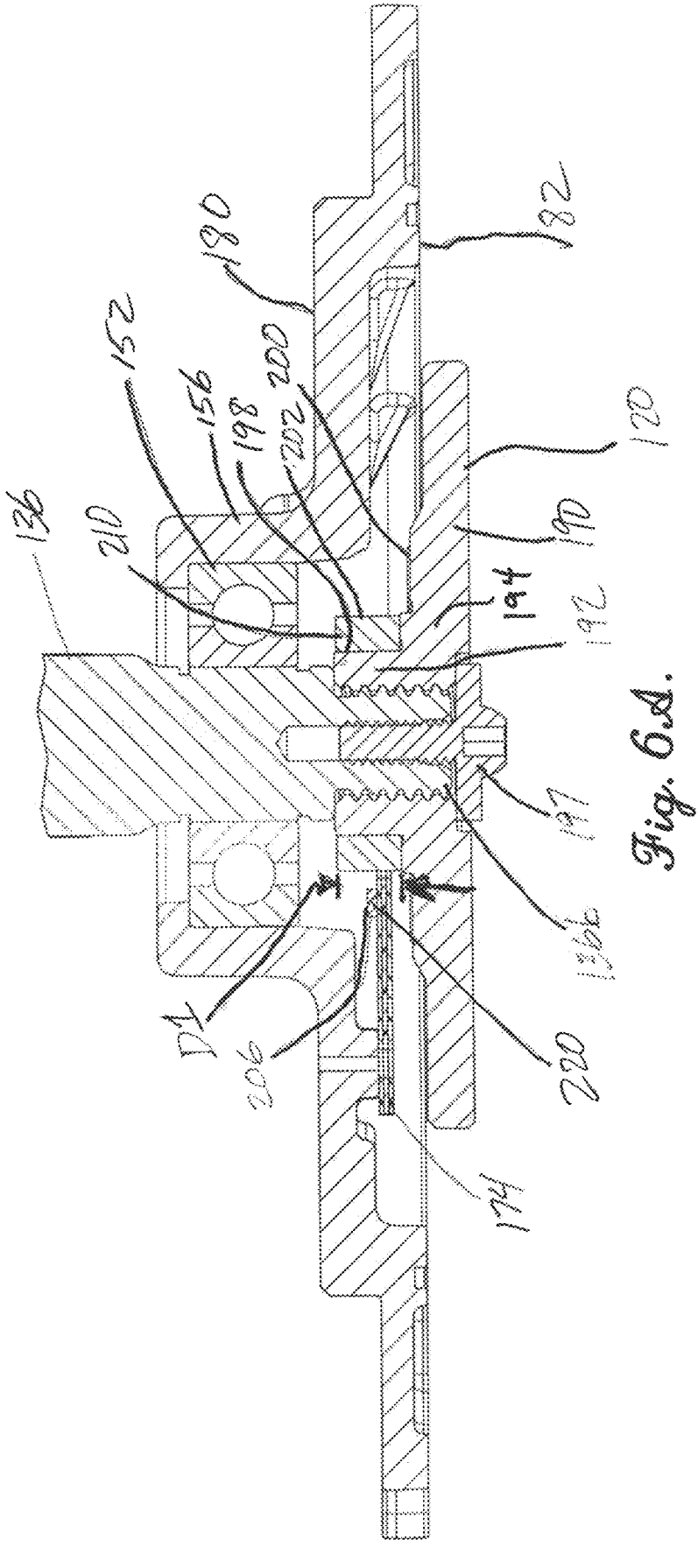
FIG. 6A is a fragmentary cross-sectional side view of the motor of FIGS. 2-5, depicting the rotor shaft, flywheel, encoder assembly, and end plate, with a magnetic sensing chip being shown adjacent a magnetic ring mounted on a hub of the flywheel.
Figure 6B:
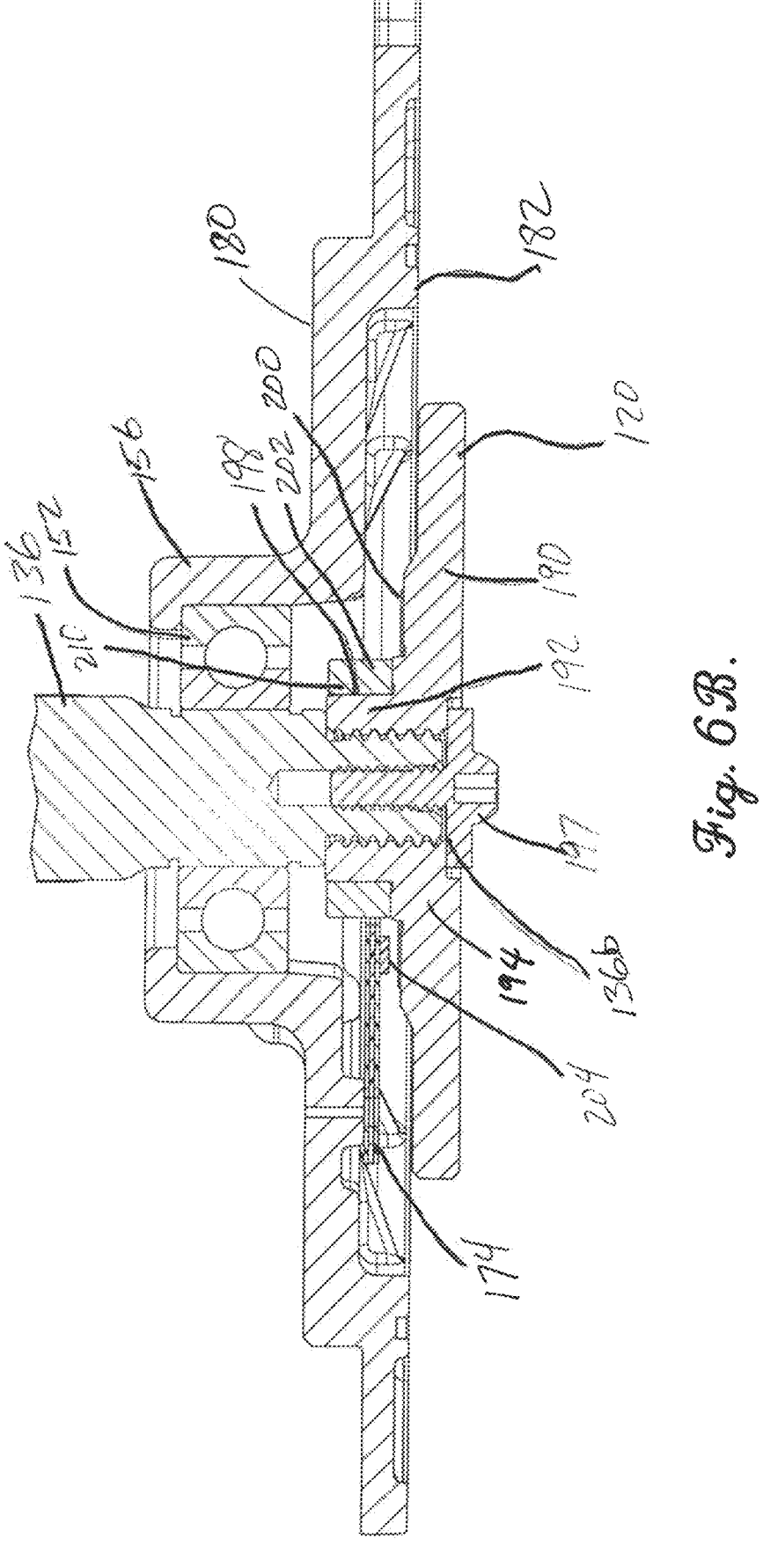
FIG. 6B is a fragmentary cross-sectional side view of the motor similar to FIG. 6A, but depicting the optical sensor assembly positioned adjacent a sensed optical element mounted on the flywheel.
Figure 7:
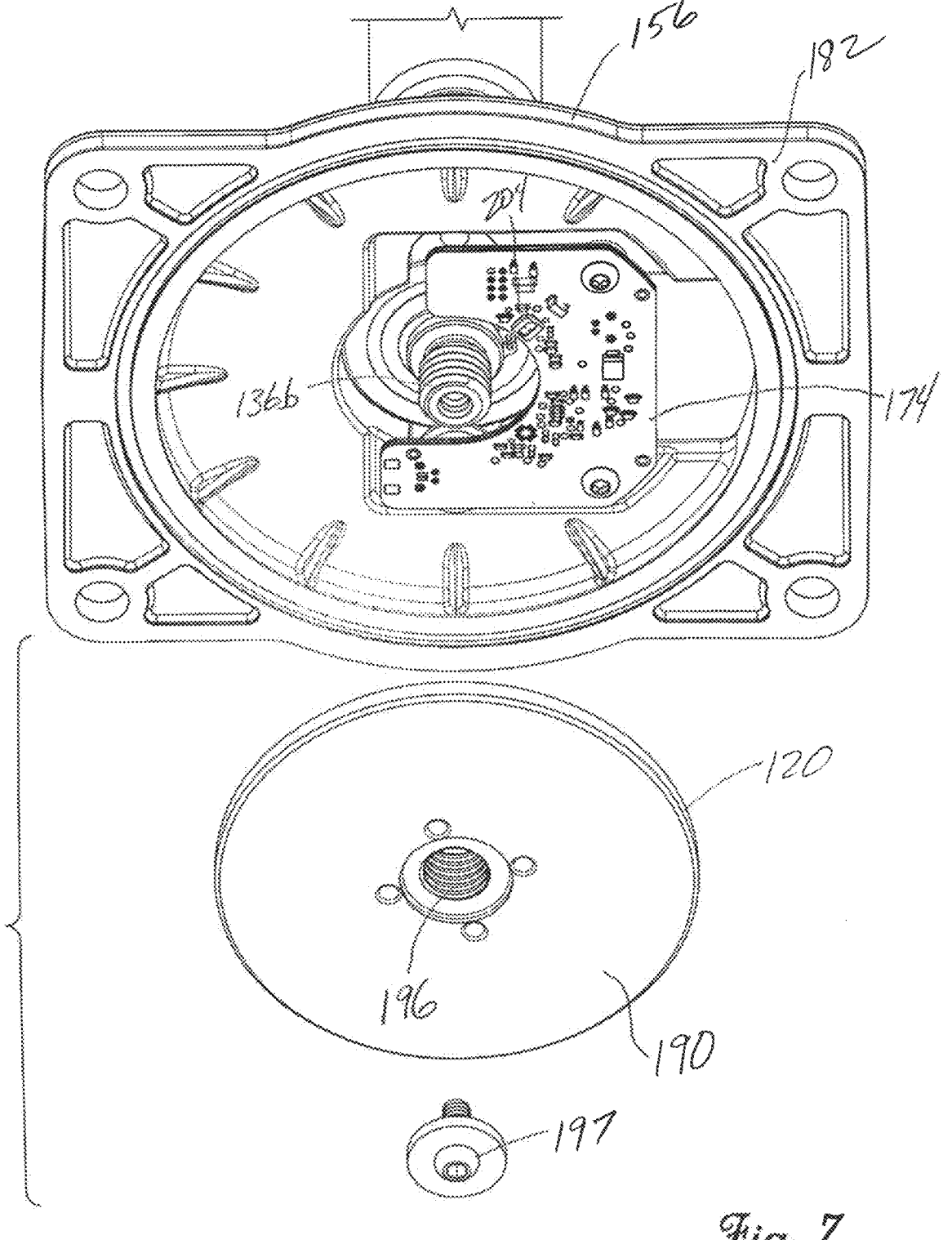
FIG. 7 is a fragmentary exploded perspective view of the motor of FIGS. 2-6B, depicting the base plate removed and the flywheel detached from the rotor shaft.

The sensed magnetic element 202 preferably comprises a rotatable magnetic ring 210 (see FIGS. 6A, 6B, and 8). The hub 194 of the flywheel 120 fixedly supports the magnetic ring 210. The magnetic ring 210 preferably defines an axial ring length dimension D1 (see FIG. 6A).

Again, the annular recess 198 of the hub 194 is configured to receive the magnetic ring 210. The hub 194 is configured so that the magnetic ring 210 is positioned along the rotor shaft 136 and spaced inwardly from the shaft end 136*b*.

As noted above, it is within the ambit of certain embodiments for the encoder assembly to be devoid of a sensed optical element. For instance, where magnetic sensing of the flywheel is suitable for motor operation, alternative motor embodiments may include only a sensed magnetic element.

The encoder assembly 124, again, preferably includes the optical sensor assembly 204 and the magnetic sensor assembly 206. The depicted optical sensor assembly 204 is configured to sense relative movement of the sensed optical element 200.

The optical sensor assembly 204 is preferably located between the circuit board 174 and the wheel disc 190. In the illustrated embodiment, the magnetic sensor assembly 206 is located on the other side of the circuit board 174 so that the sensor assemblies 204 and 206 are mounted on opposite sides of the circuit board 174. At least certain alternative embodiments, within the ambit of the present invention, may have optical and magnetic sensor assemblies mounted on the same side of the circuit board.

The magnetic sensor assembly 206 is configured to sense relative movement of the sensed magnetic element 202. Specifically, the magnetic sensor assembly 206 preferably includes a magnetic sensing chip 220 (see FIGS. 3 and 6A) positioned axially along the rotor shaft 136.

The hub 194 of flywheel 120 fixedly supports the magnetic ring 210 in at least partial axial alignment with the magnetic sensing chip 220 such that rotation of the magnetic ring 210 is sensed by the magnetic sensing chip 220.

In the depicted embodiment, optical sensor assembly 204 and magnetic sensor assembly 206 are stationary relative to the motor housing 122. Preferably, the magnetic sensing chip 220 is positioned axially midway along the axial ring length dimension D1.

Although the optical and magnetic sensor assemblies 204 and 206 are located on the same side of the wheel disc 190, it will be appreciated that one or both sensor assemblies may be alternatively positioned. For example, at least certain alternative embodiments may have optical and magnetic sensor assemblies located on opposite sides of the wheel disc.

Any directional references (such as top, bottom, front, back, side, up, down, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein, the terms axial, axially, and variations thereof mean the defined element has at least some directional component along or parallel to the axis. These terms should not be limited to mean that the element extends only or purely along or parallel to the axis. For example, the element may be oriented at an oblique angle relative to the axis but, because the element extends at least in part along the axis, it should still be considered axial. Similarly, the terms radial, radially, and variations thereof shall be interpreted to mean the element has at least some directional component in the radial direction relative to the axis.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The invention claimed is:

1. A motor comprising:

a rotor rotatable about an axis and including a rotor shaft;

a flywheel fixed to the rotor shaft to rotate therewith; and an encoder assembly including a sensed optical element and a sensed magnetic element, said encoder assembly further including an optical sensor assembly configured to sense relative movement of the optical element and a magnetic sensor assembly configured to sense relative movement of the magnetic element, said sensed elements being mounted on the flywheel for rotational movement therewith, such that the optical sensor assembly and the magnetic sensor assembly are each configured to sense rotation of the flywheel, said encoder assembly including a stationary circuit board mounted adjacent the flywheel and supporting the sensor assemblies, said flywheel including a wheel disc and a center wall, said circuit board positioned to extend radially along the wheel disc and axially overlap the center wall, said optical sensor assembly being located between the circuit board and the wheel disc, said sensor assemblies being mounted on opposite sides of the circuit board.

2. The motor as claimed in claim 1,
said sensed magnetic element comprising a magnetic ring mounted on the flywheel to rotate therewith,
said flywheel including a hub configured to receive the magnetic ring.

3. The motor as claimed in claim 2,
said hub defining an annular recess configured to receive the magnetic ring.

4. The motor as claimed in claim 2,
said magnetic sensor assembly including a magnetic sensing chip,
said magnetic ring having an axial ring length,
said magnetic sensing chip being positioned axially midway along the axial ring length.

5. The motor as claimed in claim 2,
said wheel disc and said center wall cooperatively forming the hub.

6. The motor as claimed in claim 1,
said flywheel comprising a nonferrous material.

7. The motor as claimed in claim 5,
said nonferrous material comprising a zinc material.

8. The motor of claim 1,
said sensed magnetic element including a rotatable magnetic ring,
said magnetic sensor assembly including a magnetic sensing chip positioned axially along the rotor shaft,
said flywheel including a hub that fixedly supports the magnetic ring in at least partial axial alignment with the magnetic sensing chip such that rotation of the magnetic ring is sensed by the magnetic sensing chip.

9. The motor as claimed in claim 8,
said rotor shaft presenting a shaft end,
said hub being configured so that the magnetic ring is positioned along the rotor shaft and spaced inwardly from the shaft end.

10. The motor as claimed in claim 8,
said wheel disc and said center wall cooperatively forming the hub.

\* \* \* \* \*